Feb. 3, 1959  G. HUMES  2,872,148
TRACER CONTROLLED VALVE
Filed July 3, 1953  4 Sheets-Sheet 1

INVENTOR.
GALE HUMES.
BY
Robert A. Sloman
ATTORNEY

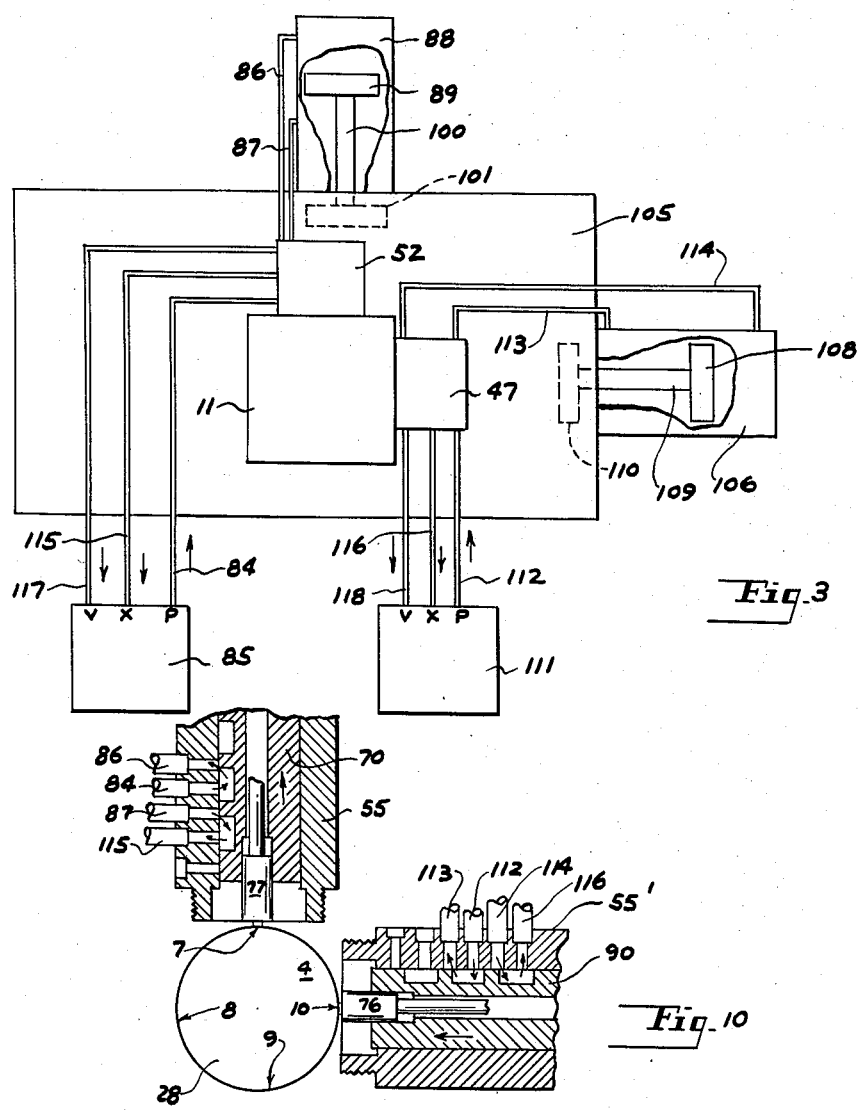

Feb. 3, 1959
G. HUMES
2,872,148
TRACER CONTROLLED VALVE
Filed July 3, 1953
4 Sheets-Sheet 3
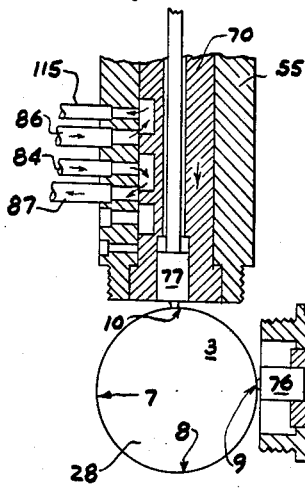
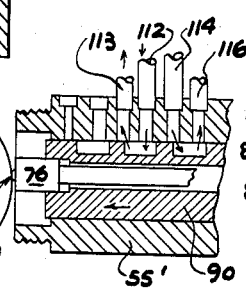
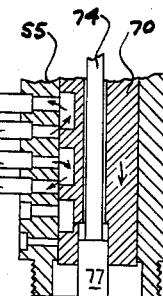
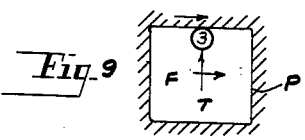
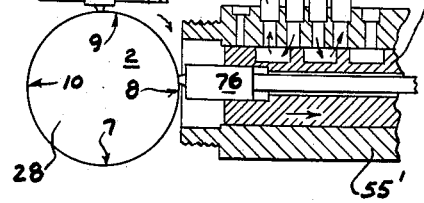
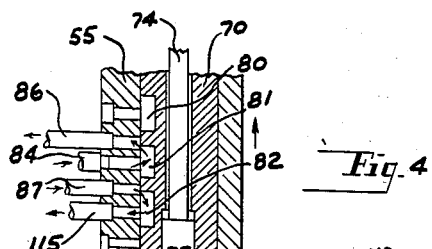
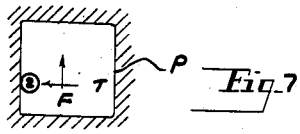
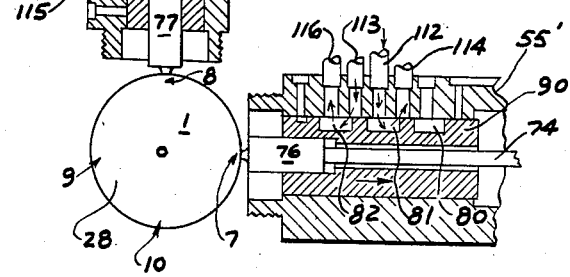
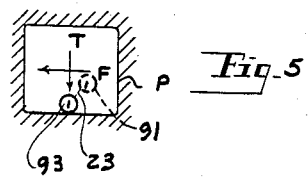
INVENTOR.
GALE HUMES.
BY
Robert A. Sloman
ATTORNEY INVENTOR.
GALE HUMES.
BY
Robert A. Sloman
ATTORNEY.

United States Patent Office 2,872,148
Patented Feb. 3, 1959

2,872,148

TRACER CONTROLLED VALVE

Gale Humes, Birmingham, Mich., assignor to Manuel Turchan, doing business as Turchan Follower Machine Company, Detroit, Mich.

Application July 3, 1953, Serial No. 365,809

10 Claims. (Cl. 251—3)

This invention relates to a hydraulic tracer mechanism, and more particularly to a hydraulic tracer adapted for use in conjunction with a contouring machine.

Heretofore, in contouring machines employing a tracer mechanism in conjunction with a pair of transversely movable slides for respectively supporting a workpiece and cutting tool and utilizing right angularly arranged hydraulic cylinders for effecting feed movements between the cutter and workpiece corresponding to relative movements between a tracer and a template, the tracer mechanism was adapted to control the feeding of one cylinder, with the other cylinder being controlled by the delivery of pressure fluid independent of the tracer. In a contouring operation, a directional control valve was heretofore employed whereby tracer control could be switched from one cylinder to the other and with fluid non-tracer controlled switched from one cylinder to the other. This required various valving arrangements whereby the fluid connections between the cylinders, the tracer and the pressure fluid source would be manually switched from time to time, and with said controls remote from the tracer.

It is the object of the present invention to provide a novel tracer construction which may be used for contouring, and wherein the tracer mechanism incorporates structure forming a part thereof, whereby the directional control valve or other valving mechanism may be entirely eliminated.

It is the further object of the present invention to provide a tracer mechanism with a rotatable cam upon a manually rotatable tracer spindle whereby said cam may function to control the initial setting of valve mechanisms for operating said cylinders and wherein the tracer is universally mounted for regulating the control effect of said cam in any of its positions of rotated adjustment.

It is the further object of the present invention to provide a rotatable spindle in a tracer mechanism, which carries a cam controlling the operation of cylinder controlling valves and wherein the action of said cam with respect to said valves may be changed by manual rotation of said spindle and with said spindle and the effect of said cams being furthermore controlled by the reaction of the spindle contactor with the template during relative feed movements.

These and other objects will be seen from the following specification and claims in conjunction with the appended drawings, in which:

Fig. 3 is a diagrammatic view illustrating the hydraulic connections between the cylinders, said valves and sources of pressure fluid.

Fig. 4 is a fragmentary section of the relationship of the valves and cam similar to Fig. 2 in one position of adjustment of said cam.

Fig. 5 is a diagram illustrating the relative positioning of the tracer contactor with respect to a portion of a pattern corresponding to the position of cam adjustment shown in Fig. 4.

Fig. 6 is a fragmentary view similar to Fig. 4, illustrating a second position of cam adjustment.

Fig. 7 is a diagram illustrating the relative positioning of the tracer contactor and pattern corresponding to said cam adjustment.

Fig. 8 is a view similar to Fig. 4, illustrating a third position of cam adjustment.

Fig. 9 is a diagram similar to Figs. 5 and 7, illustrating the positioning of said tracer contactor and pattern corresponding to said third position of cam adjustment.

Fig. 10 is a view similar to Fig. 4, illustrating a fourth position of cam adjustment.

Fig. 11 is a diagram similar to Fig. 5 showing the relative positioning of said tracer contactor and pattern corresponding to said fourth position of cam adjustment.

It will be understood that the above drawings illustrate merely a preferred embodiment of the invention, and that other embodiments are contemplated within the scope of the claims hereafter set fourth.

Figure 1:
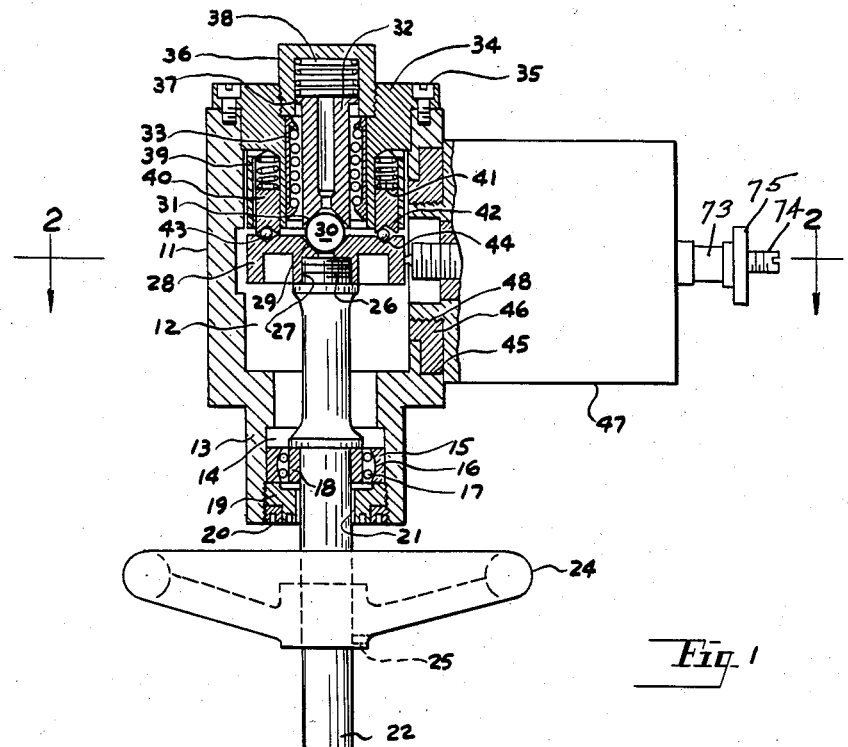
Fig. 1 is an elevational view partially in section illustrating the tracer construction.

Referring to the drawing, Fig. 1, the present tracer mechanism includes tracer body 11 with upright bore 12, and depending shank 13 of reduced diameter and with corresponding internal bore 14 of reduced diameter. Bearing race 15 is positioned within bore 14 and has arcuate surface 16 and ball bearings 17 therein cooperable with ring 18 surrounding tracer spindle 22.

The bearings are supported upon the collar 19 centrally apertured at 21 threaded up into shank 13 and secured in its adjusted position by lock nut 20, said spindle being thereby mounted upon said body and shank for universal movement, and carrying at its lower end template or pattern contactor 23.

Hand wheel 24 is mounted on spindle 22 and secured thereto by set screw 25 to permit manual rotation of said spindle, as desired in the manner hereafter set forth.

Said spindle projects above ball bearings 17 up into bore 12, and its threaded upper end 26 extends up into the interiorly threaded shank 27 of the disc 28, which shank is eccentrically arranged with respect to the central axis of said disc whereby said disc functions as a cam, as illustrated in Figs. 2, 4, 6, 8 and 10, having the high points with respect to said eccentric mounting 7 and 8 and the low points with respect to said axis 9 and 10 respectively.

Conical recess 29 formed in the top surface of cam 28 receives the ball 30, the upper portion of which supportably projects into conical recess 31 formed within the lower end of the upright piston 32.

Said piston is received within the upright ball bushing 33 within the central portion of the body cap 34, which is secured to body 11 as by the set screws 35. Adjustable spring retainer cup 36 is centrally apertured to receive the enlarged head 37 of piston 32, and interposed between said head and the upper portion of cup 36 is a coiled spring 38 normally urging said piston downwardly, which normally maintains spindle 22 in the upright axial position shown in Fig. 1.

A plurality of upright circularly arranged slots 39 are formed in cap 34 slidably receiving plungers 40 with coiled springs 41 in said slots bearing against the upper ends of said plungers. The cone shaped recess 42 in the lower ends of said plungers receives detent balls 43, which are cooperatively received within the corresponding cone shaped openings 44 within the top surface of cam 28. In the preferred embodiment shown herein, there are provided four such detents arranged at ninety degrees with respect to each other corresponding to the four ninety degree positions of rotary adjustment of the cam or disc 28.

Figure 2:
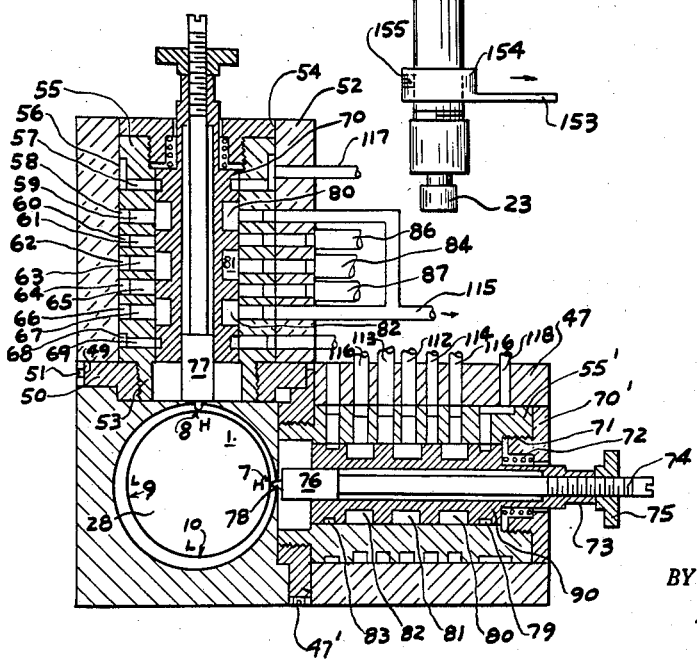
Fig. 2 is a section taken on line 2—2 of Fig. 1 illustrating the structure and arrangement of the cylinder controlling valves.

Upon one side of body 11 is the lateral recess 45 in communication with bore 12 cooperatively receiving ring 46, which is secured in the desired position of adjustment by set screws 47', Fig. 2. Said ring has a central threaded aperture adapted to receive the threaded shank 48 of the valve body 47.

Upon another upright side of tracer body 11 at right angles to aperture 45 is a second circular aperture 49 in communication with bore 12 adapted to cooperatively receive the ring 50 secured in position by the set screws 51 Second valve body 52 extending in a horizontal plane at right angles to valve body 47 has a threaded shank 53, which extends into and is secured to the ring 50, as illustrated in Fig. 2.

Both of the valve bodies 47 and 52 have a central bore 54 within which are immovably secured the cylindrical sleeves 55 and 55', which are the same within both valve bodies. As said sleeves are identical in structure, a description of one will serve as a description of the structure of both.

The sleeve 55 has formed in its outer periphery a plurality of annular longitudinally spaced recesses 56, 58, 60, 62, 64, 66 and 68

Transverse slots 57 connect recess 56 with the interior of said sleeve; transverse slots 59 connect recess 58 with the interior of said sleeve; and transverse slots 61 connect recess 60 with the interior of said sleeve; transverse slots 63 connect recess 62 with the interior of said sleeve; transverse slots 65 connect recess 64 with the interior of said sleeve; transverse slots 67 connect recess 66 with the interior of said sleeve, and transverse slots 69 connect recess 68 with the interior of said sleeve Longitudinally adjustable valves 70 and 90 are slidably positioned within each of said sleeves and each valve has formed in its outer periphery a plurality of longitudinally spaced annular recesses 79, 80, 81, 82 and 83

Both sleeves 55 and 55' have a closure cap 70' threaded at 71 into the outer end of said sleeves Said caps have a central bore receiving the coiled springs 72, which bear at one end against said caps, and at their other ends bear against the respective valves 70 and 90 normally urging the same inwardly Said valves have an elongated central bore and terminate at their outer ends in the interiorly threaded valve stems 73 for adjustably receiving threaded shafts 74 secured in adjusted position by the lock nuts 75 upon one end of said shafts.

Cylindrical plungers 76 and 77 respectively are secured upon the inner ends of said shafts, being slidably adjustable within the valve bore, said plungers having at their outer ends the projections 78 adapted to cooperatively engage the side upright annular surface of the cam or disc 28.

From Fig. 2, it appears that cam 28 by periodic rotations to any one of four positions, will regulate the positioning of the plungers 76 and 77 and their respective valves 70 and 90 with respect to the sleeves 55 and 55'.

It is contemplated, however, that any other rotated position of said cam will have a control effect on said valve, and very often intermediate positions will be employed other than the four positions above set forth.

As the cam 28 is mounted upon spindle 22, when the contactor 23 is out of engagement with the pattern, the coiled spring 38 will maintain spindle 22 in an upright axial position. Nevertheless, the positioning of the cam 28, assuming the pressure fluid is turned on, will be effective for setting the relative positioning of the two valves 70 within the sleeves 55 and 55'.

In the manner above described, the respective cylinders 88, and 106, Fig. 3, will receive pressure fluid from said valves due to their particular positioning within their respective sleeves, such that the respective pistons 89 and 108 will move in one direction or the other feeding the tracer contactor 23 in an angular direction until it engages the surface of the template or pattern. This will cause such deflection of spindle 22 as will counter-act the action of cam 28 with respect to at least one of the plungers 76 or 77 positioning it in a neutral position. The plunger so neutralized by the deflection of the spindle will correspond to the hydraulic cylinder, which will thereafter be under tracer control throughout a certain traverse of the pattern, whereas the other plunger under the action of the cam 28 will be effecting a constant feed movement of the second cylinder.

Referring to Figs. 2 and 3, conduit 84 is adapted to deliver pressure fluid from the hydraulic unit 85 and reservoir, which includes a suitable pump, which pressure fluid will be delivered to valve body 52 for communication with sleeve recess 62; and this fluid will pass to the interior of said sleeve through the slots 63. With the valve 70 in a neutral position, this pressure fluid will be blocked within the valve recess 81.

Upon an outward movement of valve 70 due to plunger 77 engaging a high point 8 on cam 28 corresponding to the number one position of cam adjustment shown in Fig. 4, this pressure fluid will communicate with valve slots 61 and recess 60 for direction through conduit 86 to one end of cylinder 88. This will effect an inward movement of piston 89 and the piston rod 100, which is adapted to be connected as at 101 to the saddle adjustably positioned upon the bed of a machine tool.

Exhaust fluid from the opposite end of cylinder 88 returns through conduit 87 back to valve body 52 and communicates with sleeve recess 64 for movement through slots 65, and into valve recess 82, which communicates with exhaust slots 67, which connect sleeve recess 66. The exhaust fluid is withdrawn from recess 66 through exhaust conduit 115 back to the fluid reservoir 85.

Consequently, an outward movement of the valve 70 from a neutral position will be a negative movement and will cause relative inward feeding of said machine saddle and the table 105, Fig. 3, which is adapted to support a workpiece and tracer engaging pattern P in fixed spaced relation. Assuming a cutting tool and the tracer are supported in spaced fixed relation, the movement of the table 105 due to the negative movement of valve 70 will be such as will feed the table relatively and the pattern thereon towards the tracer spindle.

In the manner hereafter described, a movement of valve 70 in the opposite direction or inwardly will be regarded as a positive movement and will effect relative movement of the contactor 23 away from the pattern due to said valve so controlling cylinder 88 as to cause movement of said saddle in the opposite direction.

For illustration, with said valve moved inwardly of the central position or neutral position, pressure fluid from pipe 84 flows into opening 62 and through slots 63 into valve recess 81. Said fluid will then flow through slots 65 and opening 64 into conduit 87 causing an outward movement of piston 89 within said cylinder. Exhaust fluid returns through conduit 86, opening 60, slots 61, and into valve recess 80. This exhaust fluid then enters slots 59, opening 58 and exhaust conduit 115 for return to the sump within hydraulic unit 85.

A similar operation of valve 90 within valve body 47 effects reciprocal movements of piston 108 within cylinder 106, which as shown in Fig. 3, effects longitudinal movements of the table 105 upon which a workpiece and pattern P are mounted. Here also a movement to the right of valve 90 will be regarded as a negative movement and will effect an inward movement to the left of piston 108 and a corresponding movement of table 105, such as will tend to move the tracer contactor 23 inwardly of the pattern P. Likewise a positive movement of valve 90 to the left of the central position shown in Fig. 2, will effect the opposite direction of movement of table 105.

For illustration, while a pair of hydraulic units 85 and 111 are shown in Fig. 3, it is contemplated that only one hydraulic unit could be employed for this same purpose. In any event, a pump within hydraulic unit 111 delivers pressure fluid to valve body 47 through conduit 112 and returns exhaust fluid from said valve body through the conduit 116, which fluid returns to the sump within hydraulic unit 11.

As shown in Fig. 2, the pressure fluid in pipe 112 enters openings in sleeve 55' corresponding to opening 62 and passages 63 in sleeve 55, for communication with the central valve recess 81 in valve 90. With said valve in a negative deflection to the right of its neutral position, this pressure fluid will be delivered to cylinder conduit 114 through the sleeve passages 61 and opening 60; and this fluid will be delivered to the outer end of table controlling cylinder 106. Exhaust from the opposite end of said cylinder returns through conduit 113 to valve body 47 through recess 64 and passages 65 and into valve opening 82. This exhaust fluid will then flow into sleeve passages 67 and recess 66 into the exhaust conduit 116 for return to the hydraulic unit 111.

On the other hand, a movement to the left of valve 90 under the action of coiled spring 72, being a positive movement of said valve, will direct pressure fluid from the central valve opening 81 into passages 65 and recess 64 for communication with conduit 113 connecting the inner end of cylinder 106. This will produce a movement to the right of piston 108 and the table 105 connected therewith.

Exhaust fluid from said cylinder will return through conduit 114 back to valve body 47 through recess 60 and passages 61 into valve opening 80; and thence through passages 59 and recess 58 into exhaust conduit 116 for return to the sump within the hydraulic unit 111.

Referring again to Fig. 2, valve 70 has adjacent its opposite ends the additional recesses 79 and 83, which are similarly formed within valve 90 and which are adapted for communication with passages 57 and 69 respectively and recesses 56 and 68 respectively for conducting any fluid seepage through the conduit 117 connected to valve body 52 and conduit 118 which connects valve body 47, whereby such seepage is returned to the respective sumps in the hydraulic units 85 and 111, there being suitable vacuum sources in units 85 and 111 connected to conduits 117 and 118.

*Operation*

Generally, the positioning of the valves 70 and 90 within the respective valve bodies 52 and 47 is controlled by the coiled springs 72 normally urging said valves inwardly so that said valves are spring-biased. Movement in the opposite direction of said valves is controlled by the tracer spindle 22 carrying the eccentric disc 28 or cam which operatively engages at spaced points in its outer surface, the plungers 76 and 77, adjustably connected to the valves 90 and 70 respectively. As above described, cam 28 has the high points 7 and 8 and the low points 9 and 10 with respect to its mounting 27, shown in Fig. 1. Consequently, for any single 90° or other rotary setting of the spindle 22 and the cam 28 through the handle wheel 24, there will be established a pre-determined setting for the two valves 70 and 90. For example, referring to Fig. 2, high point 7 registers with plunger 76 and high point 8 registers with plunger 77. Inasmuch as the coiled spring 38 maintains spindle 22 in a perfectly upright position, when the contactor 23 is out of contact with the pattern P, even though the spindle is perfectly axial in its positioning as in Fig. 1, there will be an initial negative displacement of both valves 70 and 90.

Figure 12:
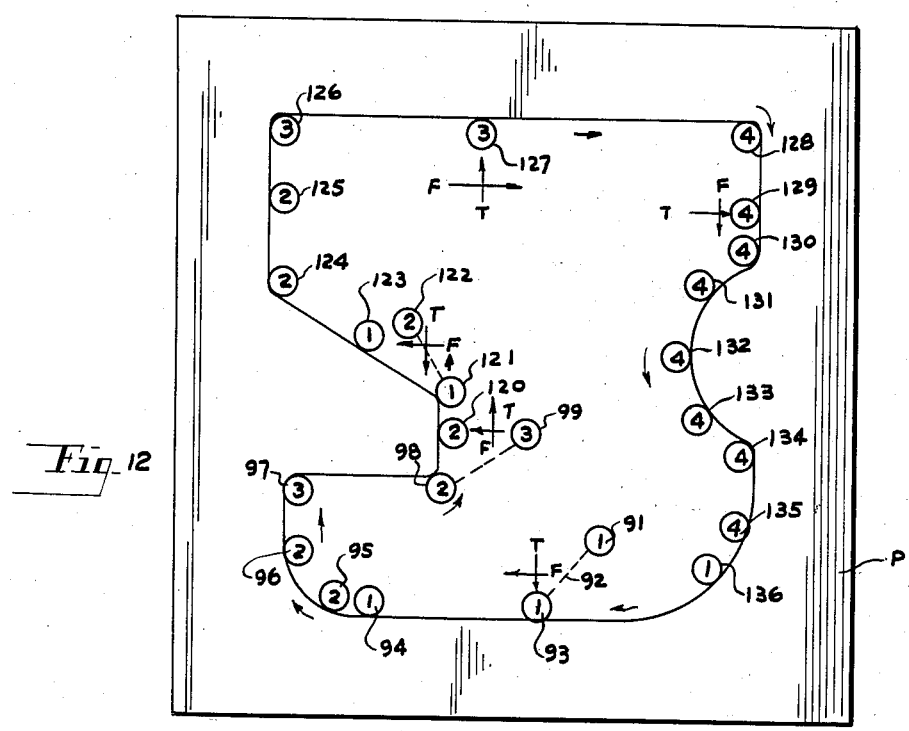
Fig. 12 is a diagram illustrating various positions of the tracer contactor with respect to a template or pattern.

As above described, this displacement of both valves will cause a simultaneous feeding of both cylinders 88 and 106 with the corresponding position of the contactor diagrammatically indicated at 91 in Fig. 12, upon the interior of the pattern P.

This simultaneous operation of both cylinders will cause the contactor 23 of the spindle to move in a relative path, indicated by the dotted line 92, to position 93 where it engages the surface of the pattern. The diagrammatic indication of various positions of contactor 23 in Fig. 12 additionally have the designations 1, 2, 3 or 4, indicating one of the four positions of adjustment of the cam 28. This description also corresponds to the illustration in Figs. 4 and 5 where the cam 28 is set in position No. 1 and the contactor has the relative position with respect to the pattern, as shown in Fig. 5.

As said contactor reaches position 93 of Fig. 12, there will be a positive deflection of spindle 22, which will in effect neutralize the effect of the high point 8 of cam 28 on the valve 70 re-positioning the same in its neutral position, so that there will be no flow of pressure fluid to either end of cylinder 88 as long as said contactor goes along a straight line portion of the pattern, such as shown in Fig. 12. As shown in the diagram of Fig. 5, the tracer in responding to that portion of the surface of pattern P corresponding to position 93 is thus controlling valve 70 or the in and out movements of cylinder 88.

The pressure of engagement of the contactor with the pattern, which has caused the deflection of cam 28, will not effectively neutralize the action of high point 7 of cam 28 with respect to valve 90, so that said valve will in effect control the continued relative feeding to the left of the contactor 23 with respect to the pattern.

As above described, there will also be a corresponding relative movement of a cutting tool with respect to said workpiece, inasmuch as the cutting tool and tracer are mounted for relative movement in unison with respect to the table 105, though the valve 90, is initially under a negative displacement the same will be partially reduced slowing down the feed movements slightly of cylinder 106.

Referring to Fig. 12, as the contactor moves from position 93 to position 94, cylinder 106 remains under the control of valve 90 and is a relative constant feed; whereas cylinder 88 and its movements are controlled by valve 70 and the tracer spindle 22 as it responds to any high or low points in the surface of the pattern P, as it traverses from position 93 to position 94, for illustration.

It is the purpose of the present invention to switch tracer control at will from one cylinder to the other and with constant feeding from one cylinder to the other, and this is accomplished by a 90 degree rotation, preferably, of spindle 22 from position 1 to position 2, as further indicated in Figs. 6 and 7 corresponding to the diagrammatic indication in Fig. 12. It will appear that as the contactor traverses the positions 95 and 96, the tracer should be controlling the feed movements of cylinder 106, whereas cylinder 88 would be under constant feeding.

Assuming that the operator fails to manually rotate the spindle at 94 to a second position No. 2, the pressure engagement of the spindle with the upwardly curving surface of the pattern would gradually neutralize the effect of the high point 7 of cam 28 upon valve 90 gradually slowing down the feed of cylinder 106 until the contact pressure with the pattern was such as to position the valve 90 in a neutral position. This would stop the feeding to the left of Fig. 12 and the spindle 22 would stop in position 95, of course, assuming that said spindle had not been turned to position 2, because with no feed movement to the left, this same pressure of engagement of the template and pattern would also return valve 70 to its neutral position. Furthermore, with no feed movement to the left, the valve 70 is ineffective for controlling the operation of cylinder 88, so that the relative movement would stop.

On the other hand, if the operator between positions 94 and 95, Fig. 12, rotates the cam 28 to position 2, then it appears that tracer control will be switched from cylinder 88 to cylinder 106. This means that valve 90 will be under control of the tracer and valve 70 will be controlling the constant feeding forwardly as indicated in Fig. 7, and the contactor will continue to move through positions 95 and 96 without stopping.

Here again, should the contactor reach position 97 without an adjustment of the cam to a third position of control, the spindle 22 would stop at position 97 because the pressure engagement of the spindle with the pattern at that point would be such as to deflect said spindle neutralizing the effect of the cam 28 on valve 70 and would stop all feed movement. It is also seen that in this position 97 that this pressure of engagement would not effect the prior neutral positioning of valve 90.

In actual operation, just before reaching point 97 the cam 28 through handwheel 24 is again rotated, preferably 90 degrees, in the same clockwise direction to position 3, which corresponds to the diagrammatic illustration in Figs. 8 and 9.

In position No. 3 of said cam and as indicated in Figs. 8 and 9, the tracer spindle will be again controlling the in and out movements of cylinder 88 through valve 70, and the cam will be so positioned as to control the constant feed movements of cylinder 106 through the operation of valve 90. Under this position of adjustment, the contactor will move along the pattern to position 98 at which point there must be another adjustment of said cam repositioning the same back to position No. 2, i. e., rotating said cam in a counter-clockwise position. Should the operator fail to so re-adjust said cam, the contactor would move off of the engaging surface of the pattern to some position, such as position 99. Therefore, as the contactor reaches point 98 or shortly before, the cam is rotated to position 2, returning tracer control to valve 90 and feed movements to valve 70, as again illustrated in Figs. 6 and 7.

The contactor 22 will then move in the direction of the arrow through position 120 wherein said contactor in responding to the surface of pattern P is controlling the relative movements of valve 90 and cylinder 106; whereas valve 70 is controlling constant feed movement of cylinder 88 under the action of low point 9 of cam 28, as in Figs. 6 and 7. Upon reaching point 121, should the operator fail to re-adjust the position of said cam back to position No. 1 in a counter-clockwise direction, the contactor would leave the pattern and travel to some intermediate position 122, indicated in Fig. 12 and shown by the dotted lines.

In operation, the operator at point 121 manually rotates the spindle and cam back to position No. 1, so that constant feeding of cylinder 106 is under the control of valve 90 responding to high point 7 of cam 28, whereas said contactor in responding to the surface of said pattern controls the operation of valve 70 regulating the in and out feed movements of cylinder 88. In this position of adjustment, the contactor moves through position 123, Fig. 12, and at the end of the inclined surface feed movement would stop due to the neutralizing effect of the contactor upon the cam overcoming the control action of the high point 7 of said cam upon valve 90.

In operation, however, the operator switches the spindle back to position No. 2 as at 124, so that as shown in Figs. 6 and 7, continued movement of the contactor along the surface of the pattern is constant under the control of valve 70 and with any in and out relative movement due to surface irregularities in said pattern controlling the operation of valve 90. The contactor passes through position 125, being position No. 2 of said cam, and at the upper corner and through handwheel 24 the cam is rotated in a clockwise direction to position No. 3. The relative movement between the contactor and pattern is then to the right, as shown in Fig. 12, with constant feeding of cylinder 106 being under the control of the low point 9 of said cam engaged by the plunger 76 of valve 90. Tracer control by the contactor in responding to the surface of the pattern is now in valve 70; and said contactor moves relatively to the pattern along the flat upper horizontal portion shown in Fig. 12.

Referring to Fig. 12, the cam 28 at points 126 and 127 is in position No. 3, and at point 128 the operator must rotate said cam, preferably 90 degrees into the No. 4 position, corresponding to additional designations of the mechanism shown in Figs. 10 and 11. In the No. 4 position, tracer control of cylinder 106 will be through valve 90 and constant feed control of cylinder 88 will ber regulated by valve 70 with said contactor moving down along the surface of said pattern through point 129 and to point 130.

Said contactor will continue to traverse the surface of said pattern throughout the points 131, 132, 133, 134 and 135 with said cam remaining in the No. 4 position of rotated adjustment.

It will be noted that at point 130, the constant relative feed of the contactor with respect to the pattern will be slightly slowed down due to the pressure engagement of the pattern with respect to the contactor, such as will partially reduce the control effect of high point 7 of said cam on valve 70, nevertheless this feeding by cylinder 88 will continue up through the point 135. At point 135, it is desirable to now rotate said cam in a clockwise direction back to position No. 1 so that said contactor will continue to move through position 136 and return to position 93, as shown in Fig. 12. Should the operator fail to re-adjust said cam at point 136, the pressure of engagement of said contactor would increase due to the constant feeding of cylinder 88 until said pressure overcame the control effect of high point 7 of said cam on valve 70, and all feeding would stop.

As above described, with said cam in position No. 1, relative feed movements between the tracer spindle and pattern, and of course corresponding relative feed movements of a cutting tool with respect to said workpiece, will be in the same direction inasmuch as it is contemplated that the tracer mechanism and cutting tool are arranged with respect to each other in fixed relation, as are also the workpiece and pattern upon the table 105.

Fig. 5 illustrates the direction of feed movements for position No. 1 of said cam, Fig. 7 indicates said directions for position No. 2, Fig. 9 illustrates said directions of feed movements for position No. 3, and Fig. 11 illustrates the direction of feed movements for position No. 4.

In position 93, Fig. 12, the feed movement is to the left. Should it be desired to reverse the direction of feed movement, the cam would be rotated, preferably 90 degrees to position No. 4. This means also that at any point of traverse of the contactor, a reverse direction of feeding can be obtained by rotating the cam in reverse direction of 90 degrees.

As shown in Fig. 1, the ball detents 43 serve for locating the cam 28 in any of its four positions of rotated adjustment. Any other position of said cam throughout 360 degrees of rotation may be employed, if desired, and the detents could be omitted.

Figure 13:
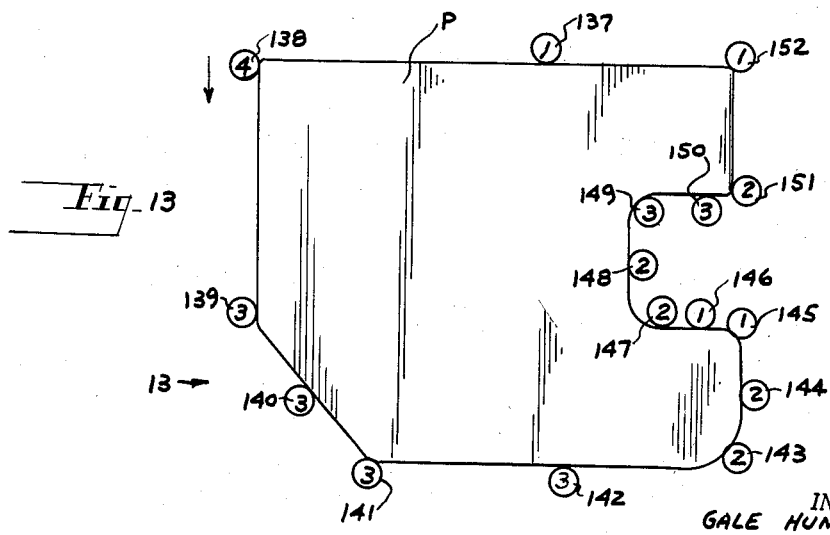
Fig. 13 is a view similar to Fig. 12 showing various positions of said contactor with respect to the outside of a pattern.

Fig. 13 is another diagrammatic illustration of a pattern P with the tracer contactor moving upon the exterior surface thereof, with the circled positions of said contactor throughout portions of its periphery being designated by the numerals 1, 2, 3, or 4, corresponding to the position of cam adjustment which would be employed in traversing the exterior contour of said pattern. For example, assuming the relative feeding is from right to left, in location 137, the cam is in No. 1 position. At location 138, the cam is changed to No. 4 position. At location 139 the cam is adjusted to No. 3 position and said contactor moves through points 140 and at point 141 and 142, said cam will stay in position No. 3 but at location 143 will be changed to position No. 2 where it will stay through location 144. At location 145 and up to 146, the cam will be in position No. 1.

For continued feed movements the cam will be changed at 147 to position No. 2, where it will stay through location 148, and will be changed at 149 to position No. 3. At position 150, it will remain in position No. 3 and will be changed back to position No. 2 at 151 and return to position No. 1 at point 152.

The present tracer mechanism is manually rotated from time to time to different positions of cam adjustment at the critical points above described with respect to Figs. 12 and 13 to thereby obtain a certain setting with respect to the operation of the two valves 70 and 90. During traversing of the contour of a pattern, said positions of the cam will be controlling the operation of one of said valves, whereas the reactions of the contactor with respect to the pattern will be regulating the control effect of other portions of said cam upon the other valve 90.

While positions 7, 8, 9 and 10 of cam 28 provide for maximum control effect upon valves 70 and 90, nevertheless it is contemplated that manual positioning of the cam with respect to plungers 76 and 77 may be at intermediate positions so that the operator can regulate the speed of feed movements or maintain a substantially constant rate of feed.

It is contemplated that the present invention may be applied to any machine tool as for example a milling machine.

The cutter and tracer are above described, and are in fixed relation to each other, as are also the workpiece and pattern on the slide 105, so that said workpiece and pattern are movable in two directions at right angles relative to the cutter and tracer. It is contemplated, however, that by relative feed movements the cutter may be stationary with respect to a moving workpiece and the tracer move with respect to a stationary pattern.

In Fig. 1 the tracer spindle has towards its lower end above contactor 23, pointer 153 at right angles to the spindle axis. Collar 154 on said pointer receives said spindle and is secured thereto by set screw 155. In operation, the spindle may be so manually rotated by handwheel 24 that the pointer extends in a direction at right angles to a tangential line at the point of contact between the contactor and pattern, though said pointer will not be so positioned at all times inasmuch as the spindle is not continuously rotated, but only intermittently rotated.

The pointer will aid the operator in determining whether the spindle should be turned clockwise or counterclockwise in traversing a pattern. It is contemplated that during a contouring operation, the spindle is not continuously under the manual control of the operator, and that the handwheel and spindle are only rotated during certain critical points throughout 360 degrees of the shape of the pattern traversed.

Having described my invention, reference should now be had to the claims which follow for determining the scope thereof.

I claim:

1. A tracer construction comprising a hollow body, a spindle therein projecting axially therefrom and mounted intermediate its ends upon said body for rotation in a horizontal plane and for universal tilting movements, a contactor adjacent the free end of said spindle adapted to engage and traverse the profile of a template, a hand wheel secured to said spindle outside said body for intermittent manual rotation of said spindle, a cam secured to said spindle within said body and having in its periphery right angularly related pairs of diametrically opposed high and low points, spring means on said body bearing axially inward upon said spindle normally maintaining it in an axial position, a pair of angularly arranged ported valve bodies at right angles to the spindle axis secured at their inner ends to said tracer body in communication with its interior, a slidable fluid control valve within each body, and spring means on said bodies normally urging said valves into engagement with said points of said cam, whereby an initial setting of said valves is controlled by the rotated position of said cam, one of said valves being relatively unchanged following said setting adapted to provide a substantially constant reactive valve condition, tilting movements of said spindle effecting corresponding movements of said cam for controlling the positioning of the other valve, said hand wheel being adapted to effect different 90-degree rotated settings of said points with respect to said valves.

2. A tracer construction comprising a hollow body, a spindle therein projecting axially therefrom and mounted intermediate its ends upon said body for rotation in a horizontal plane and for universal tilting movements, a contactor adjacent the free end of said spindle adapted to engage and traverse the profile of a template, a hand wheel secured to said spindle outside said body for intermittent manual rotation of said spindle, a cam secured to said spindle within said body and having in its periphery right angularly related pairs of diametrically opposed high and low points, spring means on said body bearing axially inward upon said spindle normally maintaining it in an axial position, a pair of angularly related ported valve bodies at right angles to the spindle axis secured at their inner ends to said tracer body, a slidable fluid control valve within each body, spring means on said bodies normally urging said valves towards said cam, and a cam contacting plunger adjustably secured to each valve and arranged axially thereof, whereby an initial setting of said valves is controlled by the rotated position of said cam, one of said valves being relatively unchanged following said setting adapted to provide a substantially constant reactive valve condition, tilting movements of said spindle effecting corresponding movements of said cam for controlling the positioning of the other valve, said hand wheel being adapted to effect different 90-degree rotated settings of said points with respect to said valves.

3. A tracer construction comprising a hollow body, a spindle therein projecting axially therefrom and mounted intermediate its ends upon said body for rotation in a horizontal plane and for universal tilting movements, a contactor adjacent the free end of said spindle adapted to engage and traverse the profile of a template, a hand wheel secured to said spindle outside said body for intermittent manual rotation of said spindle, a cam secured to said spindle within said body, spring means on said body bearing axially inward upon said spindle normally maintaining it in an axial position, a pair of angularly arranged ported valve bodies at right angles to the spindle axis secured at their inner ends to said tracer body, a slidable fluid control valve within each body, and spring means on said bodies normally urging said valves into engagement with spaced points of said cam, whereby an initial setting of said valves is controlled by the rotated position of said cam, said cam being formed as a circular disc eccentrically mounted upon said spindle, thereby defining in the periphery of said disc a plurality of equidistantly spaced points at varying distances from the longitudinal axis of said spindle, one of said valves being relatively unchanged following said setting adapted to provide a substantially constant reactive valve condition, tilting movements of said spindle effecting corresponding movements of said cam for controlling the positioning of the other valve, said hand wheel being adapted to effect different 90-degree rotated settings of said points with respect to said valves.

4. A tracer construction comprising a hollow body, a spindle therein projecting axially therefrom and mounted intermediate its ends upon said body for rotation in a horizontal plane and for universal tilting movements, a contactor adjacent the free end of said spindle adapted to engage and traverse the profile of a template, a handwheel secured to said spindle outside said body for intermittent manual rotation of said spindle, a cam secured to said spindle within said body, spring means on said body bearing axially inward upon said spindle normally maintaining it in an axial position, a pair of angularly arranged ported valve bodies at right angles to the spindle axis secured at their inner ends to said tracer body, a slidable fluid control valve within each body, and spring means on said bodies normally urging said valves into engagement with spaced points of said cam, whereby an initial setting of said valves is controlled by the rotated position of said cam, said cam being formed as a circular disc eccentrically mounted upon said spindle thereby defining in the periphery of said disc right angularly related pairs of diametrically opposed high and low points, one of said valves being relatively unchanged following said setting adapted to provide a substantially constant reactive valve condition, tilting movements of said spindle effecting corresponding movements of said cam for controlling the positioning of the other valve, said handwheel being adapted to effect different 90-degree rotated settings of said points with respect to said valves.

5. A tracer construction comprising a hollow body, a spindle therein projecting axially therefrom and mounted intermediate its ends upon said body for rotation in a horizontal plane and for universal tilting movements, a contactor adjacent the free end of said spindle adapted to engage and traverse the profile of a template, a handwheel secured to said spindle outside said body for intermittent manual rotation of said spindle, a cam secured to said spindle within said body, spring means on said body bearing axially inward upon said spindle normally maintaining it in an axial position, a pair of angularly arranged ported valve bodies at right angles to the spindle axis secured at their inner ends to said tracer body, a slidable control valve within each body, spring means on said bodies normally urging said valves into engagement with spaced points of said cam, whereby an initial setting of said valves is controlled by the rotated position of said cam, said cam being formed as a circular disc eccentrically mounted upon said spindle thereby defining in the periphery of said disc a pair of high points and a pair of diametrically opposed low points, there being equidistantly spaced depressions formed in the top surface of said cam corresponding radially to each of said high and low points, and similarly spaced yielding spring-urged ball detents mounted on said body registering with said depressions for locating the rotated position of said high and low points with respect to said valves, one of said valves being relatively unchanged following said setting adapted to provide a substantially constant reactive valve condition, titling movements of said spindle effecting corresponding movements of said cam for controlling the positioning of the other valve, said handwheel being adapted to effect different 90-degree rotated settings of said points with respect to said valves.

6. A tracer construction comprising a hollow body, a spindle therein projecting axially therefrom and mounted intermediate its ends upon said body for rotation in a horizontal plane and for universal tilting movements, a contactor adjacent the free end of said spindle adapted to engage and traverse the profile of a template, a handwheel secured to said spindle outside said body for intermittent manual rotation of said spindle, a cam secured to said spindle within said body and having in its periphery right angularly related pairs of diametrically opposed high and low points, spring means on said body bearing axially inward upon said spindle normally maintaining it in an axial position, a pair of angularly arranged ported valve bodies at right angles to the spindle axis secured at their inner ends to said tracer body, a slidable fluid control valve within each body, spring means on said bodies normally urging said valves into engagement with spaced points of said cam, whereby an initial setting of said valves is controlled by the rotated position of said cam, said cam having a central depression in its top surface in registry with the spindle axis, and spring means including an axial plunger in the tracer body having a conical recess in one end, a ball in said depression registering within said recess, and a coiled spring in said body bearing against the other end of said plunger, one of said valves being relatively unchanged following said setting adapted to provide a substantially constant reactive valve condition, tilting movements of said spindle effecting corresponding movements of said cam controlling the positioning of the other valve, said handwheel being adapted to effect different 90-degree rotated settings of said points with respect to said valves.

7. A tracer construction comprising a hollow body, a spindle therein projecting axially therefrom and mounted intermediate its ends upon said body for rotation in a horizontal plane and for universal tilting movements, a contactor adjacent the free end of said spindle adapted to engage and traverse the profile of a template, a handwheel secured to said spindle outside said body for intermittent manual rotation of said spindle, a cam secured to said spindle within said body, spring means on said body bearing axially inward upon said spindle normally maintaining it in an axial position, a pair of angularly arranged ported valve bodies at right angles to the spindle axis secured at their inner ends to said tracer body, a slidable fluid control valve within each body, spring means on said bodies normally urging said valves towards said cam, said valves extending outwardly of their bodies and having a longitudinal bore, a shaft extending through the bore of each valve and threadedly engaging at one end portions of the corresponding valve, and extending beyond the other end of said valve, and a cam engaging plunger upon the other end of said shaft and longitudinally adjustable within said bore, whereby said plungers are adjustable relatively to their corresponding valve, and whereby an initial setting of the valves is controlled by the rotated position of said cam, one of said valves being relatively unchanged following said setting adapted to provide a substantially constant reactive valve condition, tilting movements of said spindle effecting corresponding movements of said cam for controlling the positioning of the other valve, said handwheel being adapted to effect different 90-degree rotated settings of said points with respect to said valves.

8. A tracer construction comprising a hollow upright body, an upright spindle therein projecting axially therefrom and mounted intermediate its ends upon said body for rotation in a horizontal plane and for universal tilting movements, a handwheel secured to said spindle below said body for intermittent manual rotation of said spindle, a cam secured to said spindle within said body and having in its periphery right angularly related pairs of diametrically opposed high and low points, spring means within said body bearing axially downward upon said spindle normally maintaining it in an upright position, a pair of right angularly arranged horizontally disposed valve sleeves secured at their inner ends to said tracer body in communication with its interior, a slidable fluid control valve within each sleeve, spring means in said sleeves normally urging said valves into engagement with spaced points of said cam, whereby an initial setting of said valves is controlled by the rotated position of said cam, and a pattern engaging contactor at the lower end of said spindle whereby deflection of said spindle effects corresponding movements of said cam for regulating the control effect of said cam on said valves, each of said sleeves having formed therein longitudinally spaced passages adapted for connection to a pressure source, to exhaust and to opposite ends of a hydraulic cylinder, each of said valves having a plurality of longitudinally spaced annular recesses in its outer surface adapted to separately establish fluid communication between said source and one end of a cylinder controlling rate and direction of operation and for connecting the other end of said cylinder to said exhaust, said valves on relative movement within their sleeves adapted to switch the connection of said source to the other end of said cylinder simultaneously switching the exhaust connections from said cylinder, whereby said contactor on any setting of said cam in responding to the surface of a pattern is adapted to simultaneously control the operation of both valves and their connected cylinders, one of said valves being relatively unchanged following said setting adapted to provide a substantially constant reactive valve condition, tilting movements of said spindle effecting corresponding movements of said cam for controlling the positioning of the other valve, said handwheel being adapted to effect different 90-degree rotated settings of said points with respect to said valves.

9. A tracer construction comprising a hollow body, a spindle therein projecting axially therefrom and mounted intermediate its ends upon said body for rotation in a horizontal plane and for universal tilting movements, a contactor adjacent the free end of said spindle, adapted to engage and traverse the profile of a template, a handwheel secured to said spindle outside said body for intermittent manual rotation of said spindle, a cam secured to said spindle within said body, spring means on said body bearing axially inward upon said spindle normally maintaining it in an axial position, a pair of angularly arranged ported valve bodies at right angles to the spindle axis secured at their inner ends to the tracer body in communication with its interior, a slidable fluid control valve within each body, spring means on said bodies normally urging said valves into engagement with spaced points with said cam, whereby an initial setting of said valves is controlled by the rotated position of said cam, deflection of said spindle effecting corresponding movements of said cam for regulating the control effect of said cam on said valves, and a pointer secured to and extending at right angles to said spindle above said contactor adapted for intermittent manual positioning at right angles to a tangential line at the point of engagement of said contactor with said template, one of said valves being relatively unchanged following said setting adapted to provide a substantially constant reactive valve condition, tilting movements of said spindle effecting corresponding movements of said cam for controlling the positioning of the other valve, said handwheel being adapted to effect different 90-degree rotated settings of said points with respect to said valves.

10. A tracer construction comprising a hollow body, a spindle therein projecting axially therefrom and mounted intermediate its ends upon said body for rotation in a horizontal plane and for universal tilting movements, a contactor adjacent the free end of said spindle adapted to engage and traverse the profile of a template, means connected to said spindle outside said body for intermittent rotation of said spindle, a cam secured to said spindle within said body and having in its periphery right angularly related pairs of diametrically opposed high and low points, a pair of angularly arranged ported valve bodies at right angles to the spindle axis secured at their inner ends to said tracer body in communication with its interior, a slidable fluid control valve within each body, and means on said bodies normally urging said valves into engagement with said points of said cam, whereby an initial setting of said valves is controlled by the rotated position of said cam, one of said valves being generally unchanged following said setting adapted to provide a substantially constant reactive valve condition, tilting movements of said spindle effecting corresponding movements of said cam for controlling the positioning of the other valve, said spindle rotating means being adapted to effect different rotated settings of said points with respect to said valves, some tilting movements of said spindle being adapted to modify the reactive valve condition of said one valve.

References Cited in the file of this patent

UNITED STATES PATENTS

| 2,158,558 | Atkins | May 16, 1939 |
| 2,263,110 | Turchan | Nov. 18, 1941 |
| 2,332,533 | Roehm | Oct. 26, 1943 |
| 2,337,166 | Overbeke | Dec. 21, 1943 |
| 2,386,825 | Turchan | Oct. 16, 1945 |
| 2,389,653 | Turchan et al. | Nov. 27, 1945 |
| 2,578,362 | Kluver | Dec. 11, 1951 |
| 2,589,204 | Parsons | Mar. 14, 1952 |
| 2,600,746 | Ernst | June 17, 1952 |

FOREIGN PATENTS

| 762,270 | France | of 1934 |